(12) United States Patent
Pettey et al.

(10) Patent No.: US 11,745,391 B2
(45) Date of Patent: Sep. 5, 2023

(54) METHOD OF MANUFACTURING COMPLEX-SHAPED, FLEXIBLE, AND REUSABLE TANKS

(71) Applicant: RESPONSE TECHNOLOGIES, LLC, West Warwick, RI (US)

(72) Inventors: David A. Pettey, Westport, MA (US); Edmund Francis Bard, Cumberland, RI (US)

(73) Assignee: RESPONSE TECHNOLOGIES, LLC, West Warwick, RI (US)

(*) Notice: Subject to any disclaimer, the term of this patent is extended or adjusted under 35 U.S.C. 154(b) by 29 days.

(21) Appl. No.: 15/787,155

(22) Filed: Oct. 18, 2017

(65) Prior Publication Data

US 2018/0036916 A1 Feb. 8, 2018

Related U.S. Application Data

(63) Continuation-in-part of application No. 15/098,783, filed on Apr. 14, 2016, now Pat. No. 10,688,775.
(Continued)

(51) Int. Cl.
*B29C 33/38* (2006.01)
*B29C 33/50* (2006.01)
(Continued)

(52) U.S. Cl.
CPC ........ *B29C 33/3842* (2013.01); *B29C 33/505* (2013.01); *B29C 49/44* (2013.01);
(Continued)

(58) Field of Classification Search
CPC ... B29C 49/44; B29C 33/505; B29C 33/3842; B29C 64/10; B29C 53/602; B33Y 10/00
See application file for complete search history.

(56) References Cited

U.S. PATENT DOCUMENTS

| 2,736,356 A | 2/1956 | Oates, Jr. |
| 3,313,664 A | 4/1967 | Reinhart, Jr. |
| (Continued) | | |

OTHER PUBLICATIONS

Teng et al., "Optimal Design of Filament-Wound Composite Pressure Vessels", Mechanics of Composite Materials, vol. 41, No. 4, pp. 333-340 (2005).
(Continued)

*Primary Examiner* — Francisco W Tschen
*Assistant Examiner* — Elisa H Vera
(74) *Attorney, Agent, or Firm* — Lando & Anastasi, LLP

(57) ABSTRACT

A method of fabricating a tank includes connecting a pressure source to a nozzle on a male mold, inflating the male mold via the nozzle, forming a tank by applying at least one layer over the outer surface of the male mold, the tank having a port formed about the nozzle, deflating the male mold, and withdrawing the male mold through the port. A method of fabricating a tank includes 3D-printing a male mold, connecting a pressure source to a nozzle on the male mold, inflating the male mold via the nozzle, forming a tank by applying at least one layer over the outer surface of the male mold, the tank having a port formed about the nozzle, deflating the male mold, and withdrawing the male mold through the port. A method of fabricating a tank includes forming a tank on a mold formed from a foam blocks.

12 Claims, 15 Drawing Sheets

Related U.S. Application Data

(60) Provisional application No. 62/148,406, filed on Apr. 16, 2015.

(51) Int. Cl.
*B29C 49/44* (2006.01)
*B33Y 10/00* (2015.01)
*B33Y 80/00* (2015.01)
*B29C 64/10* (2017.01)
*B29L 31/00* (2006.01)

(52) U.S. Cl.
CPC .............. *B29C 64/10* (2017.08); *B33Y 10/00* (2014.12); *B33Y 80/00* (2014.12); *B29L 2031/7172* (2013.01)

(56) References Cited

U.S. PATENT DOCUMENTS

| | | | |
|---|---|---|---|
| 3,470,928 A | | 10/1969 | Schwartz |
| 3,648,650 A | | 3/1972 | Joy |
| 3,664,904 A | | 5/1972 | Cook |
| 3,703,201 A | | 11/1972 | Musyt et al. |
| 3,831,939 A | | 8/1974 | Lorber |
| 3,835,605 A | | 9/1974 | Ueno |
| 4,193,518 A | | 3/1980 | Holmes |
| 4,660,594 A | | 4/1987 | Gocze |
| 4,865,096 A | | 9/1989 | Schober et al. |
| 5,314,653 A | * | 5/1994 | Haralambopoulos ..... A61F 6/04 264/301 |
| 5,316,611 A | * | 5/1994 | Moser ................... B65H 54/64 156/425 |
| 5,368,395 A | | 11/1994 | Crimmins |
| 5,509,255 A | | 4/1996 | Rutledge |
| 5,590,803 A | | 1/1997 | Kaempen |
| 5,687,434 A | | 11/1997 | Tagg |
| 5,772,938 A | | 6/1998 | Sharp |
| 5,809,650 A | | 9/1998 | Reese et al. |
| 5,910,138 A | | 6/1999 | Sperko et al. |
| 6,021,915 A | | 2/2000 | Shimozono et al. |
| 6,145,692 A | | 11/2000 | Cherevatsky |
| 6,267,399 B1 | | 7/2001 | Buckmiller et al. |
| 6,715,644 B2 | | 4/2004 | Wilford |
| 8,790,565 B2 | | 7/2014 | Miller |
| 8,916,249 B2 | | 12/2014 | Liang et al. |
| 9,533,526 B1 | * | 1/2017 | Nevins ................... G09B 5/067 |
| 2002/0117781 A1 | * | 8/2002 | LeBreton ............... B29C 33/505 264/314 |
| 2004/0086720 A1 | | 5/2004 | Gan et al. |
| 2004/0202807 A1 | | 10/2004 | Earnest |
| 2006/0039780 A1 | | 2/2006 | Butcher et al. |
| 2006/0078234 A1 | | 4/2006 | Chandra et al. |
| 2007/0196651 A1 | | 8/2007 | Tijink et al. |
| 2008/0272116 A1 | | 11/2008 | Martucci et al. |
| 2009/0299327 A1 | * | 12/2009 | Tilson ............... A61M 25/0147 604/500 |
| 2010/0086721 A1 | * | 4/2010 | Batchelder ........... B65D 81/113 428/43 |
| 2010/0314386 A1 | | 12/2010 | Buonerba et al. |
| 2012/0084999 A1 | * | 4/2012 | Davis .................. B29C 37/0067 156/289 |
| 2012/0305711 A1 | | 12/2012 | Shannon |
| 2012/0315569 A1 | | 12/2012 | Tanigawa et al. |
| 2013/0130029 A1 | | 5/2013 | Hirose et al. |
| 2013/0158494 A1 | | 6/2013 | Ong et al. |
| 2013/0277372 A1 | | 10/2013 | Waku |
| 2013/0284303 A1 | | 10/2013 | Gauckler et al. |
| 2014/0312043 A1 | * | 10/2014 | Sejima ................ B29C 45/0046 220/586 |
| 2014/0339745 A1 | * | 11/2014 | Uram ..................... B29C 39/36 264/681 |
| 2015/0045907 A1 | | 2/2015 | Sambusseti |
| 2015/0291332 A1 | | 10/2015 | Misciagna |
| 2016/0000374 A1 | * | 1/2016 | Dandekar ............ A61B 5/4362 600/301 |
| 2016/0176124 A1 | | 6/2016 | Tranquart et al. |
| 2016/0177078 A1 | * | 6/2016 | Naito ..................... C08L 25/12 264/109 |
| 2017/0253760 A1 | | 9/2017 | Zheng et al. |
| 2018/0362794 A1 | | 12/2018 | Ferkel et al. |

OTHER PUBLICATIONS

Wittman et al., "Hand Lay-Up Techniques", Handbook of Composites by G. Lubin, chapter 13, pp. 321-367 (1982).
"Jacquard machine UNIVAL 100 for technical fabrics", STAUBLI; http://www.staubli.com/en-us/textile/textile-machinery-solutions-jacquard-weaving-unival-100; retrieved: Jan. 21, 2020.
"MACH2X WholeGarment Knitting Machines", Shima Seiki; http://www.shimaseiki.com/product/knit/mach2x/index2.html; retrieved: Jan. 21, 2020.

* cited by examiner

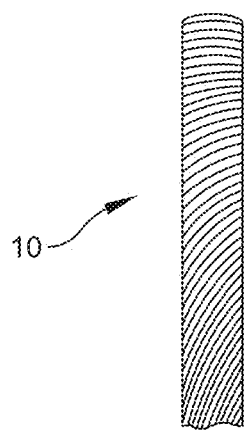
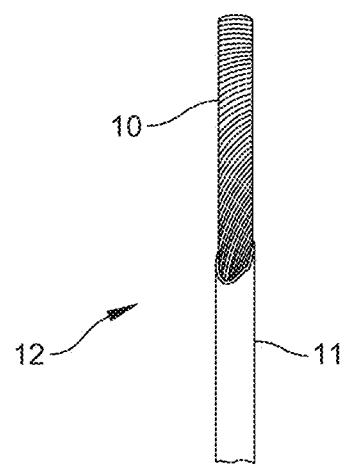
FIG. 1a          FIG. 1b
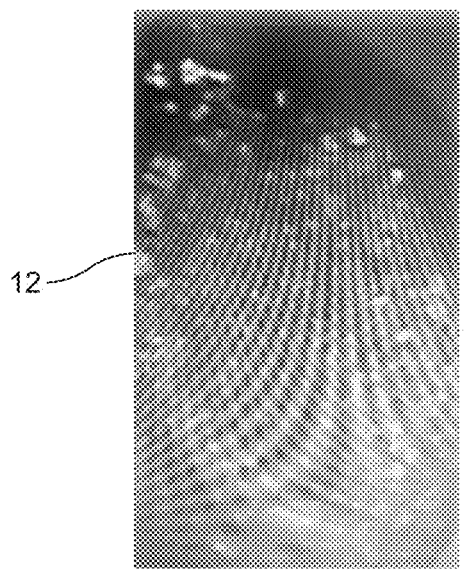
FIG. 1c

METHOD OF MANUFACTURING COMPLEX-SHAPED, FLEXIBLE, AND REUSABLE TANKS

RELATED APPLICATIONS

This application is a continuation-in-part under 35 U.S.C. § 120 of U.S. application Ser. No. 15/098,783 titled "METHOD OF MANUFACTURING CONTAINMENT BLADDERS" filed on Apr. 14, 2016, which claims priority under 35 U.S.C. § 119(e) to U.S. Provisional Application Ser. No. 62/148,406 titled "Method of Manufacturing Containment Bladders" filed on Apr. 16, 2015, each of which is herein incorporated by reference in its entirety.

BACKGROUND OF THE INVENTION

The present disclosure is directed to solid, liquid and gas handling systems and more particularly to a method of manufacturing containment bladders for the cost effective storage and transportation of various solids, liquids, and gases.

The transportation, storage and protection of a diverse variety of solids, liquids, and gases, such as fuels, chemicals, air, foodstuffs, organic materials, water, and liquids, have been greatly limited by the currently used materials and fabrication techniques. Typical handling systems include storage units that incorporate protective materials that have been uniquely matched to the contents they contain. These materials can be expensive, and may only be compatible with one solid, liquid, or gas to be transported. In addition, the methods of fabricating the current storage units are capital intensive, often requiring major set-up charges for unique dies and tools for each rigid product produced. Consequentially, the prohibitive cost results in less product available to the mass market. For example, explosion-proof fuel systems are commonplace within professional racing circuits, but have not been availed to the commercial automotive market, which experiences approximately 230,000 vehicle fires per year in the United States alone.

The current manufacturing process requires a time-consuming and costly supply chain, including about four to five levels of highly capital-intensive vertical steps. These four to five steps are typically performed by unique entities, with very few entities fully integrated with each other. This long and complex supply chain has limited product innovation, and has high waste factors and lead-times as a result. A fundamental consequence of the limitations of the current process is that lighter, more functional, less expensive, and better designed products are not being introduced to the market.

The current storage unit fabrication processes, such as the tank or bladder assembly process, rely on a labor intensive cut-and-sew operation. The current methods for assembling the storage units require high waste factors, and heavier weight materials. Patterns are cut from rolled goods, and the unused materials are wasted as scrap. Seaming the parts together to make the final containment bladder requires extra material to produce overlapped seams, skilled labor, and aggressive adhesive chemistries. The fabrication method itself, which may include thermoplastic welded or adhered seams, translates to the primary mode of failure for the final product.

To address the shortcomings of current storage containers and the methods of making the same, there is a need for additively manufacturing containment bladders for the cost effective storing and transportation of various solids, liquids, and gases whereby the primary mode of failure in the current units is obviated. Specifically, the method of the present disclosure provides numerous advantages over current methods of fabricating storage units. For example, the improved process enables the use of higher strength and higher performance materials. In addition, the improved additive processes allow for the flexible and rapid manufacturing of unique tank and bladder designs. The improved process can also allow for the manufacture of containment bladders having universal containment protection that are compatible with all materials to be stored and/or transported. Furthermore, the improved storage containers may be up to about 40 percent lighter in weight, and may be more readily scalable than current storage containers.

The current art of fabricating flexible and rigid fuel tanks (bladders, vessels, containers, manifolds, and other 3D parts), in various shapes and sizes, is to pre-build a disposable male mold and to form the object (tank) around the mold. These male molds can be formed via cardboard and plaster. The forms are built to the desired inside dimensions of the final flexible tank. With the male mold formed, the process then entails layering-up the male mold with various materials needed to meet the final performance requirements of the tank. For example; various layers of textiles for strength, coatings and films to form liquid barriers, adhesives to hold layers together, layers of self-sealing materials for ballistic tolerance, layers for abrasion and UV protection, etc. Fittings can also be applied at this stage of the manufacturing process. There may also be various curing and surface treatment steps that are involved during the layering process.

Once the tank, has been built-up, the male mold must then be removed from what is now the inside of the tank. This is a destructive process, and a labor intensive process. Additionally, the process of removing the sacrificial male mold may cause damage to the tank itself. As can be visualized, this process restricts the kinds of tanks that can be made. For example, tanks must have sufficiently sized ports or fitting sizes to allow the removal of the sacrificial male mold.

SUMMARY

In one aspect of the present disclosure, a method of manufacturing a seamless, non-wicking containment bladder comprises providing yarn materials, coating the yarn materials with a precursor protective coating, loading the yarn materials into an additive manufacturing machine, and depositing the yarn materials in pre-selected amounts and locations to form a desired three-dimensional (3D) structure.

In some embodiments, the method further comprises heat setting the desired 3D structure to produce a final form. In some embodiments, heat setting comprises heating the desired 3D structure at about 200° C. to about 500° C. In some embodiments, heat setting comprises heating the desired 3D structure for about 1 minute to about 10 minutes. In some embodiments, the method further comprises applying a pressure to the desired 3D structure. In some embodiments, the pressure applied to the desired 3D structure is between about −2 bar and about 8 bar. In some embodiments, the method further comprises applying a final coating material or combination of materials to the final form. In some embodiments, the final coating material or combination of materials comprises a thermosetting resin. In some embodiments, the final coating material or combination of materials comprises a thermoplastic polyvinylidene fluoride.

In some embodiments, the yarn materials comprise high tenacity yarns or a combination of high tenacity and yarns with other unique performance characteristics. In some embodiments, the yarn materials comprise thermoplastic yarns and/or combinations of thermoplastic, P-Aramid, and other high-performance yarns.

In some embodiments, the precursor protective coating comprises polyvinylidene fluoride and/or thermoplastic resins and alloys, or combinations of resins and alloys.

In some embodiments, depositing the yarn materials comprises executing a computer aided design program.

In one aspect of the present disclosure, a containment bladder is formed by the above method.

In one aspect of the present disclosure, a method of fabricating a tank comprises connecting a pressure source to a nozzle on a mold, the mold having a first portion and a second portion connected at a seam, the mold having an inner surface and an outer surface; inflating the mold via the nozzle; forming a tank by applying at least one layer over the outer surface of the mold, the tank having a port formed about the nozzle; deflating the mold; and withdrawing the mold through the port.

In some embodiments, the mold includes a PVC coated reinforced fabric having a thickness of 40 thousandths of an inch.

In some embodiments, the mold comprises a material that has a Shore A hardness between 20 and 95.

In some embodiments, forming the tank further includes curing the tank at a temperature between 150° F. and 300° F.

In some embodiments, the method further comprises coating the outer surface of the mold with a release agent.

In some embodiments, a reinforced portion of the mold has a first thickness of at least 100 thousandths of an inch and an adjacent portion has a second thickness of 40 thousandths of an inch.

In some embodiments, the mold includes one of a reinforced thermoplastic fabric, a knitted jersey fabric having at least one first polymeric layer on an inner surface of the knitted jersey fabric and at least one second polymeric layer on an outer surface of the knitted jersey fabric, and a non-reinforced film.

In one aspect of the present disclosure, a method of fabricating a tank comprises 3D-printing a mold, the mold including a body having an inner surface, an outer surface and a nozzle; connecting a pressure source to the nozzle on the mold; inflating the mold via the nozzle; forming a tank by applying at least one layer over the outer surface of the mold, the tank having a port formed about the nozzle; deflating the mold; and withdrawing the mold through the port.

In some embodiments, the mold has a wall thickness between 4 thousandths of an inch and 200 thousandths of an inch.

In some embodiments, the mold includes one of a rubber and an elastomeric material.

In some embodiments, the mold includes an elastomeric material with a sharp glass transition temperature between 120° F. and 160° F.

In some embodiments, the mold constitutes a male mold, the method further comprising 3D-printing a complementary female mold and forming the tank between the male mold and the female mold.

In some embodiments the female mold includes a material selected from: ABS, nylon, and PET.

In some embodiments, the method further comprises positioning a plurality of support struts within the mold and removing the plurality of support struts before forming the tank.

In some embodiments, 3D-printing the mold includes 3D-printing a textile structure and coating the textile structure with a coating having one of: rubber and an elastomeric material.

In some embodiments, the coating includes a first coating applied to the inner surface of the mold and a second coating applied to the outer surface of the mold.

In some embodiments, 3D-printing the mold includes 3D-printing a textile structure and 3D-printing a coating comprising one of rubber and an elastomeric material.

In some embodiments, 3D-printing the textile structure and 3D-printing the coating are performed in one of parallel and series.

In one aspect of the present disclosure, a method of fabricating a tank comprises assembling a plurality of foam blocks within a 3D textile scaffold to form a mold including a body having an outer surface, the plurality of foam blocks including a first set of foam blocks and a second set of foam blocks, each foam block of the first set of foam blocks having a first density, the first set of foam blocks being arranged near a periphery of the mold, each foam block of the second set of foam blocks having a second density that is lower than the first density, the second set of foam blocks being arranged in a core of the mold; forming a tank on the outer surface of the mold; and withdrawing the mold through a port defined in the tank.

In some embodiments, at least one foam block of the first set of foam blocks includes at least one locator pin for forming a port on the tank.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 1a is a view of a yarn in accordance with one embodiment of the disclosure;

FIG. 1b is a view of a coated yarn in accordance with one embodiment of the disclosure;

FIG. 1c is a cross-sectional view of the coated yarn;

DETAILED DESCRIPTION OF THE INVENTION

Figure 2A:
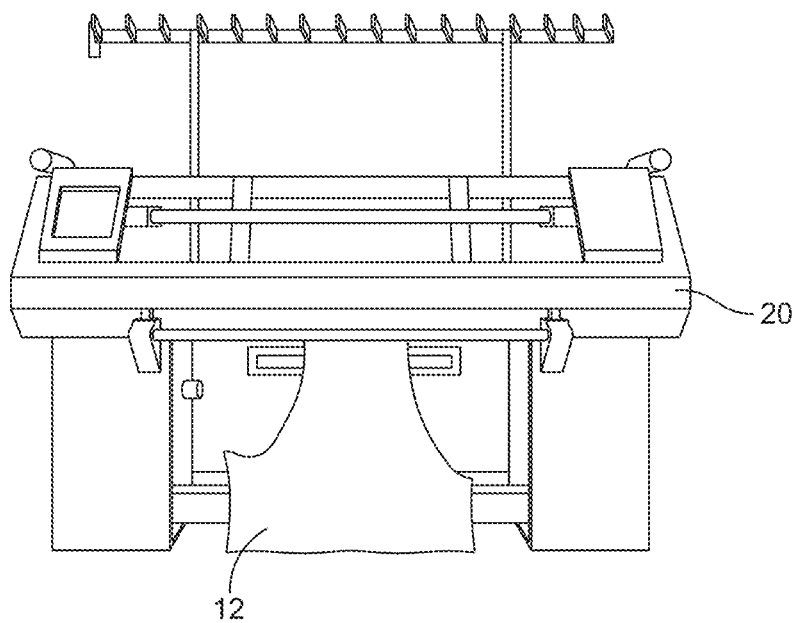
FIG. 2a is a front perspective view of a 3D knitting machine.

The following detailed description is of the best currently contemplated modes of carrying out exemplary embodiments of the disclosure. The description is not to be taken in a limiting sense, but is made merely for the purpose of illustrating the general principles of the present disclosure.

Broadly, an embodiment of the present invention provides a method of manufacturing containment bladders for the safer, more cost effective storing and transportation of various solids, liquids, and gases whereby the primary mode of failure found in the current methods and devices is obviated. The primary mode of failure found in the current methods and devices is seam failure. The method relies on additive manufacturing techniques to precisely fabricate containment bladders and prevent waste. The method may include multiple steps performed by integrated entities. In some embodiments, the method may include providing high tenacity yarns uniquely selected based on predetermined design specifications; coating the selected yarns with a precursor protective coating; dimensioning and adapting the containment bladder within a CAD-knitting software application; fabricating selected yarns in a 3D knitting or weaving machine loaded with the CAD-Knitting or CAD-Weaving software applications; heat-setting and molding a final form of the containment bladder; applying to the formed containment bladder a unique final coating; and, in certain embodiments, applying to the formed containment bladder unique connections, attachments, and components pursuant to the predetermined design specifications.

Referring to the drawings, methods of the present disclosure enable the cost effective manufacture of design-to-need light weight, flexible, storage tanks/containment bladders. Because the methods of the present disclosure may dramatically reduce the cost of manufacture, more expensive higher performance materials can be used in construction. In addition, universally compatible materials can be used that afford the product universal protection across a wide range of stored products. In such an embodiment, the same containment bladders would have equal efficacy across all solid, liquid and gas contents, for example, fuels, chemicals, and water. In current methods, for example, coatings must be adjusted to uniquely address the fuels they are containing. Tanks containing ethanol would need different coatings than those containing Avgas, resulting in larger inventory carrying costs.

The method may include providing high tenacity yarns 10, as illustrated in FIG. 1a, which are uniquely selected based on the predetermined design specifications so as to achieve the optimal design properties, such as resulting weight, and puncture, tear, and tensile strength. In some embodiments, the high tenacity yarns may be selected based on strength, durability, and/or life expectancy. The high tenacity yarns may be any yarn, or combination of yarns suitable to the end use of the containment vessel. For example, the high tenacity yarn may comprise P-aramids, polyether ether ketone (PEEK), HT-Polyester, HT-Nylon, HT-Polypropylene, poly(p-phenylene-2,6-benzobisoxazole (PBO), carbon-based yarn, meta-aramids, and combinations thereof. In certain embodiments, the selection pallet of high tenacity yarns may be restricted to thermoplastic yarns, as the final three-dimensional (3D) structure may need to be thermally heat-set to hold its form. For example, in applications where the containment vessel is fit or nested within an existing compartment, the shape and dimensions of the final product needs to be precisely sized and set. Explosion resistant fuel bladders used in professional racing circuits require such precision.

Next, the method may include coating the selected yarns 10 with a precursor protective coating 11. The coated yarn 12 is illustrated in FIG. 1b. The precursor protective coating 11 may be a thermoplastic and elastomeric covering or otherwise compatible with the final film or coating. The application of this precursor chemistry may provide an initial and additional protective barrier around the selected yarns 10. In certain embodiments, the precursor protective coating 11 may be adapted to directly adhere to the selected yarns 10, and subsequently adhere to the final film or coating. In some embodiments, the yarns 10 may need to be first treated in order for the coating 11 to sufficiently anchor to the yarn system 10. The pretreatments may be physical or chemical, and there are several applications known to the art. In some embodiments, thermoplastic chemistries may be ideal precursor protective coatings, since they may further assist in the shaping of the 3D containment bladder structure. The fabric coating process may have a variety of available commercial solutions, and may be a function of the size and shape of the containment bladder, as well as the chemistry selection itself. The fabric coating process may not be necessary for all applications. For example, where strength, protection, and longevity requirements are low, a precursor coating may not be required. In the case of high explosion resistant and crash surviving flexible fuel tanks, a coating 11, atop yarn 10 is necessary to prevent wicking of the fuel being contained in the tank itself. Fuel wicking into the fabric structure is a primary mode of failure for the current art.

In some embodiments, the precursor protective coating 11 may be polyvinylidene fluoride (PVDF). PVDF has a long life expectancy and is high resistant to a large range of fluids. For example, harsh chemicals and high ethanol content fuels. This is an improvement over the traditionally used polyurethane, which has a shorter lifespan, and is not universally compatible across a broad range of containment liquids, solids, and gases.

The precursor protective coating 11 may be applied by any processes that are capable of precisely coating the yarn. For example, the precursor protective coating 11 may be robotically applied, based on a pre-determined computer program. Where precision and cost are not critical, the coating 11, may also be applied through a dipping and drying process. FIG. 1c illustrates the cross-section of the coated yarn 12 shown in FIG. 1b. The thickness and uniformity of the coating impacts the manufacturing process and the performance of the containment bladder. The thinner the application of the coating, the easier it is for the coated yarns to undergo the subsequent textile formation process, such as knitting or weaving. The thicker the coating, the greater the coating protects the final containment bladder by limiting the potential for the containment fluid to breach the coating barrier. Containment fluids breaching the final coating barrier enables fluids to wick into the textile structure. Wicking of fluids into the textile structure is a key cause of accelerated failures in current containment bladders.

The containment bladder may be dimensioned and adapted within a CAD-Knitting or CAD-Weaving additive manufacturing software application. Using the yarns 10 and coated yarns 12 that were selected during the previous steps, the containment bladder may be virtually assembled via a CAD program, whereby the shape, physical, and aesthetic features of the containment bladder 25 are formed. This step requires the expertise of a fabric designer, coupled with the technical knowledge of a textile engineer. The designer may construct the fabrics to their desired shape, while the engineer selects the number, location, size, and types of yarns that are in the structure in order to achieve the predetermined product design specifications.

Figure 2B:
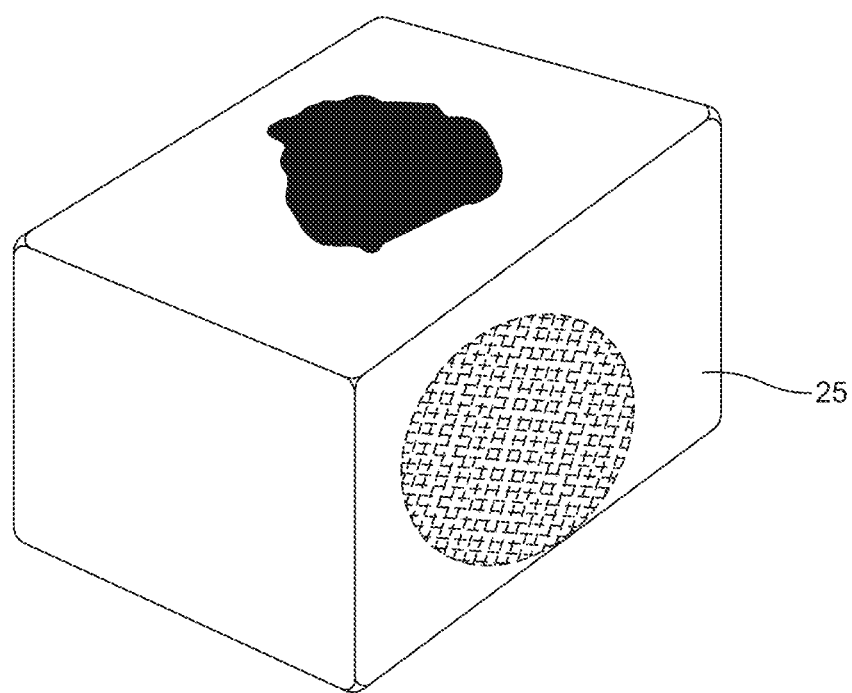
FIG. 2b is a perspective view of an uncoated formed containment bladder in accordance with one embodiment of the disclosure.

The selected coated yarns 12 may be processed through a 3D knitting (i.e., additive manufacturing) machine 20, as illustrated in FIG. 2a, loaded with the pre-designed CAD-Knitting software application. This step substantially produces the containment bladder in its preliminary form (FIG. 2b). The selected combination of yarns 10, and/or, coated yarns 12 may be fed into the 3D knitting machine 20, and deposited according to the uploaded pre-designed CAD program. The CAD information may be loaded into the programmable logic control (PLC) of the 3D knitting additive manufacturing machine 20, and the yarns 10, and/or, 12 may be placed where they are uniquely fed into the 3D knitting machine 20 as and where needed. The 3D knitting machine 20 is uniquely able to construct the final product so that no cutting, sewing, or seaming may be needed. Further, yarns are only consumed within the structure as needed, optimizing cost and physical performance. Finally, yarns of different types and/or constructions of different densities can be strategically placed within the final product. For example, the design of a vessel may be optimized by deploying HT-polyethylene terephthalate (HT-PET) yarns within the body of the vessel, and the corners may be reinforced with P-aramid yarns. In some embodiments, vessels having attachments and ports connected to them may need a denser construction with unique yarns at the attachment points.

In the next step, the containment bladder may be heat-set and molded to its final form 25. The completed 3D structure from the printing stage can have a loose shape, and may lack sufficient rigidity or self-supporting form, so it may be heat-set and formed via a molding or thermo-forming process. The heat-setting process may enable the form to be compatible with the final coating process step. For this reason, a preparation process involving heat and pressure may be used to set the structure into its final form. This setting process has the added benefit of causing the thermoplastic coatings on the yarns to begin to flow and merge with neighboring yarns, forming a structural bridge over the interstices of the textile structure. The molding process may not be necessary for all applications. For example, where the containment bladder needs to be kept more flexible, and where a more amorphous final shape is tolerable or preferred. An automotive driver side airbag may be a specific example of a containment bladder requiring flexibility. A further example may be stand-alone auxiliary fuel or water tanks, where the resulting unfilled vessels are far more flexible and collapsible, and have increased payload capacities.

The heat setting step may occur at elevated temperatures. An elevated temperature may be any temperature above room temperature of the polymer being used, to a temperature approaching its melting point. In some embodiments, the heat setting step may include heating the containment bladder at about 200° C. to about 500° C. The containment bladder may be heat for about 1 minute to about 10 minutes. The heat setting step also may occur at varied pressures. The pressure may be any pressure at, above, or below atmospheric pressure. The range of pressures can vary greatly, and can depend on whether the product is sucked into the mold by a vacuum-forming negative pressure, or blow into the mold using positive pressure. The pressure may range from about −2 bar to about 9 bar. In some embodiments, the ideal operating pressure range is from about −1.0 bar to about 2.5 bar. Cycle times are optimized by increasing the time and pressure, while limiting the set-up time.

Figure 3:
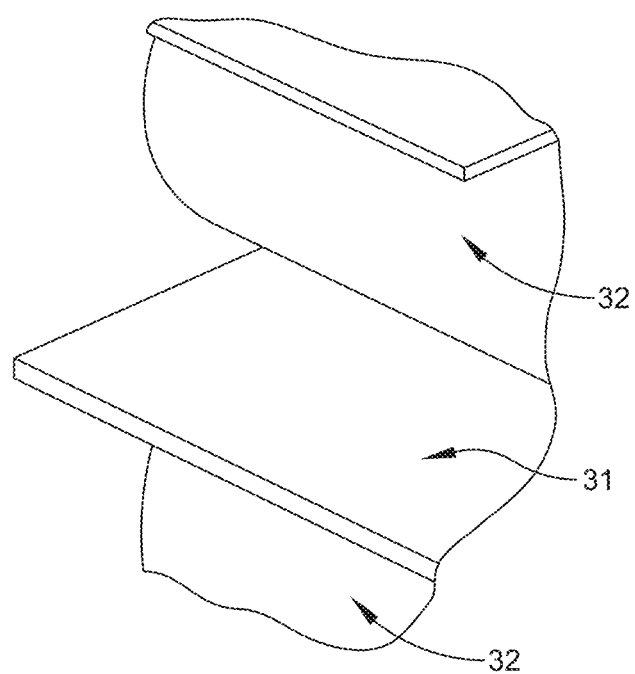
FIG. 3 is a perspective view of the application of a precursor coating to the formed containment bladder in accordance with one embodiment of the disclosure.

In certain embodiments, a unique final coating 32 may be precisely applied to the textile scaffold 31 of the formed containment bladder 25 with the compatible type and thickness of protective chemistry, as shown in FIG. 3. The amount and type of chemistry applied may be governed by the predetermined design specifications, aesthetics, and cost considerations. Specific thermoplastic and elastomeric chemistries may be selected so as to afford the desired predetermined design specifications. The thermoplastic chemistries may be selected to provide, for example, chemical, fuel, fire, heat, static, bio absorption, or UV resistance. FDA approved chemistries may also present a consideration for potable applications. Further, the chemistries may be compatible with the coating process itself, for example, by spraying, extruding, hot melt coating, blow molding, or laminating. The fabric coating process may have a variety of available commercial solutions, and may be a function of the size and shape of the tank/bladder, as well as the chemistry selection itself. The fabric coating process may not be necessary for all applications; for example, where strength, protection, and longevity requirements are low.

Figure 4:
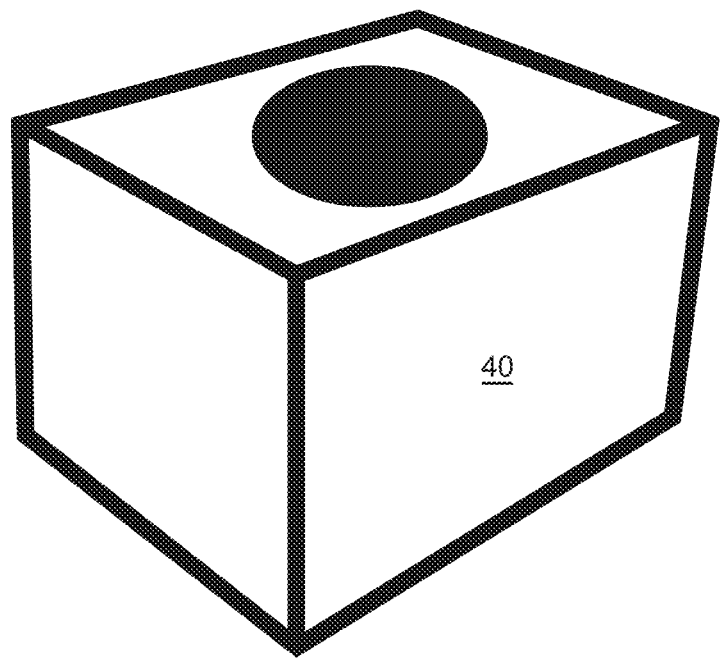
FIG. 4 is a perspective view of the containment bladder.

In some embodiments, the unique final coating 32 may be polyvinylidene fluoride (PVDF). PVDF has a long life expectancy and is resistant to a wide range of: fluids, gases, and solids, as well as being highly heat resistant. In some embodiments, the final coating 32 may be applied by the same means of applying the precursor coating 11. For example, the final coating 32 may be applied precisely through robotic means by way of programmed instructions. The containment bladder may be formed to its final shape 40 after the application of the unique final coating, as illustrated in FIG. 4. Using appropriate thermal spraying techniques, different coating surfaces can be applied to the containment vessel. For example, the inside of a containment vessel may be coated with PVDF 32 if the containment vessel will contain fuels or aggressive chemistries. Meanwhile, the outside of the tank may be coated with a lower cost thermoplastic polyurethane (TPU) 32 that is better suited for UV resistance and protection from the elements.

Finally, in certain embodiments, unique connections, attachments, and components may be applied to the containment bladder, based at least in part on the predetermined design specification. These additions may be, for example, connection ports, breather valves, grounding connections, or anti-sloshing foams. In some embodiments, some connection ports will have been built into the design at the CAD program process. Others may be simple and/or small cutouts from the containment bladder at the end of the manufacturing process. Anti-sloshing baffles/foams can be extruded in-situ using blowing agents or metered gases in the extrusion process, converted from bun stock of reticulated foam, or subsequently placed in the finally formed tank/bladder.

Figure 5:
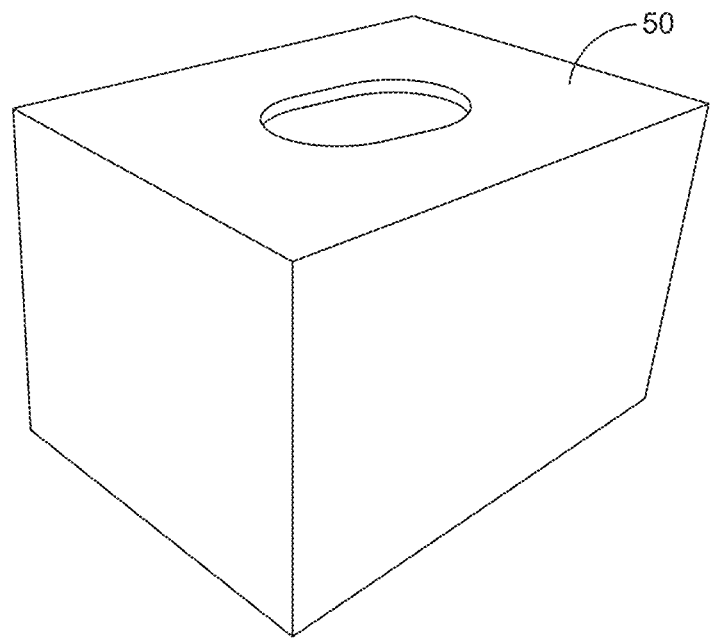
FIG. 5 is a perspective view of a final containment bladder in accordance with one embodiment of the disclosure.

The containment bladder may be formed into its final shape 50 after the addition of connections, attachments, and/or components. In some embodiments, in the absence of additional connections, attachments, and components, the containment bladder may be formed into its final shape 40 after the application of the unique final coating. A final containment bladder 50 is illustrated in FIG. 5.

Figure 6:
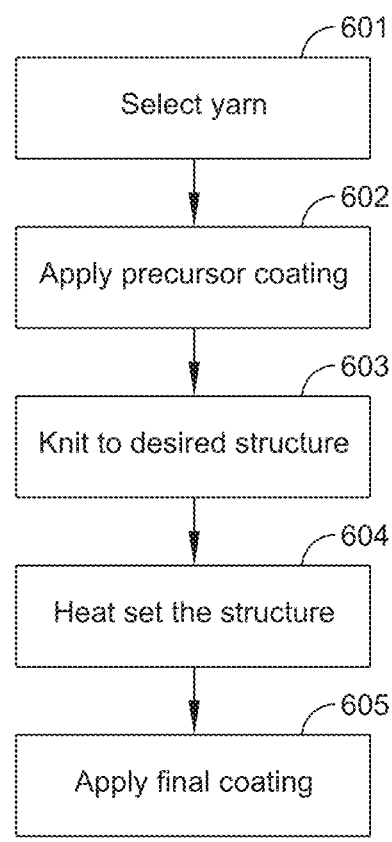
FIG. 6 is a schematic diagram of an exemplary method of manufacturing a containment bladder of an embodiment of the disclosure.

As shown in FIG. 6, a method of manufacturing a containment bladder may include the following processing steps: selecting a yarn (Step 601); applying a precursor coating to the yarn (Step 602); knitting the yarn to a desired structure (Step 603); heat setting the structure (Step 604); and applying a final coating (Step 605). In some embodiments, the method may further comprise adding connections, attachments, and/or further components. By following the aforementioned steps, a user may obviate the typical containment bladder's primary mode of failure, which is the contents leaking at the fabricated seams, and/or, wicking of the contents into the textile scaffold. Further, the user may be able to vertically integrate their operations, as well as greatly increase the diversity of their product offerings. Moreover, users will benefit from a reduced cost, a less complicated and shortened supply chain, a lower working capital cost, products that are significantly lighter in weight, and products having significantly reduced carbon footprint as compared to the current containment bladders and methods of fabricating the same.

The methods disclosed herein may achieve highly automated operations. The methods may involve very low labor components and a small cellular manufacturing operation, which could be highly productive and design agile. For example, the 3D textile process may have an operational footprint of less than 100 ft$^2$, whereas traditional textile processes including warping, weaving, cutting and sewing typically take up more than 4,000 ft$^2$. In addition, the coating process of the current art can conservatively take up more than 2,000 ft$^2$, while the molding and robot-controlled spraying systems of the present disclosure may take up less than 200 ft$^2$. The cumulative additive manufacturing processes require only 10% of the floor space requirements of the current subtractive manufacturing processes. Finally, the utilization of robotic controls for applying the coating systems is not only a labor and space savings advantage, but is a necessary technology component for ensuring the precision of the coating layers consistently meet exacting thickness levels Like the 3D textile process, the use of robotic controls may enable the application of different chemistries or having different coating levels at unique areas of the vessel design. For example, the design may be more robust if added amounts of coating were applied at the mounting locations of the connectors.

In alternative embodiments, the present disclosure may include methods of manufacturing oil booms, automotive airbags, integrated impact protection performance wear, micro fuel cells (for example, for use on drone and other unmanned ground and air craft), bio-medical structures and biomimetic devices, inflatable watercraft hulls, and the like. An automotive airbag, for example, may use a silicone coating 11 on top of the high tenacity yarn 10. Further, given the soft edges of an automotive airbag, the object 25, would not likely need to undergo a forming or heat setting process.

According to one aspect of the present disclosure, a mold is provided to mold a flexible inflatable bladder. The mold can be used in various molding methods, such as those described above. The mold is a male mold in some embodiments. The mold can be used to form a tank on the mold.

The benefits of the male molds of the present disclosure include faster development cycles, increased tank design options, reduced material, labor, and utility costs, reduced storage space for molds, reusable molds, and reduced manufacturing lead times.

These processes are also suitable and are standard practice for making rigid composite tanks (manifolds, containers, vessels, pontoons, sponsons, etc.). An example is a custom-fabricated fuel tank made from a composite layering of carbon fiber and suitable resins. The rigid tank has a suitable size port in the final design to enable the removal of the sacrificial male mold. For this reason, many present rigid parts made from resin composites tend to be made with two molds, and consequently deal with a parting line, and/or, need for subsequent bolting together. Unlike flexible tanks, rigid tanks cannot be subsequently externally stressed to break-apart the plaster molds, so the fractured molds parts can be removed.

Figure 7:
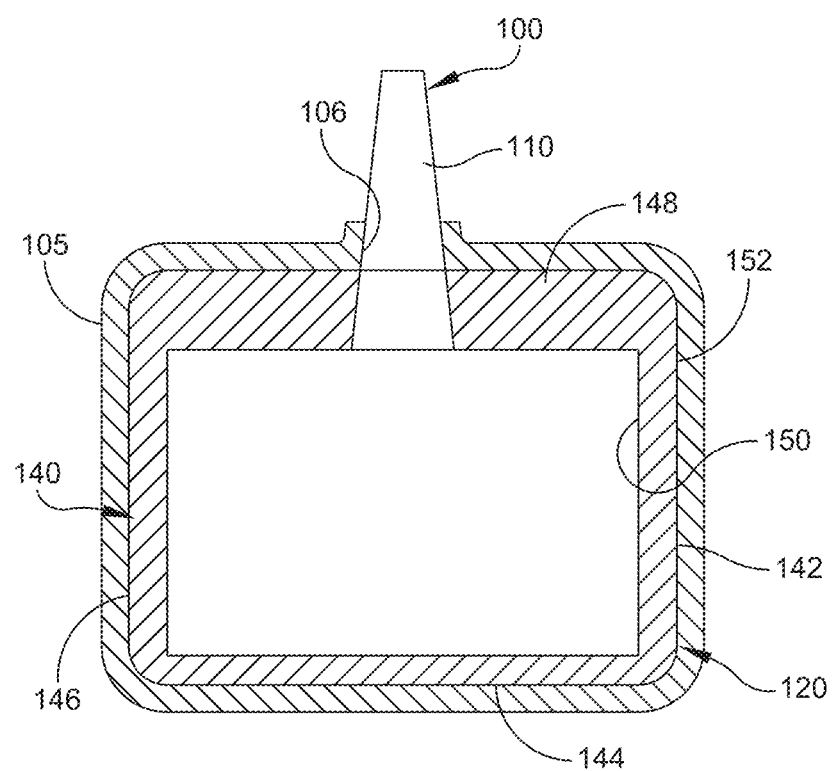
FIG. 7 is a cross-sectional view of an embodiment of a flexible, reusable mold.

According to an aspect of the present disclosure, a method of fabricating a tank is provided. FIG. 7 shows an embodiment of a mold 100 having a connection nozzle 110 that allows a user to inflate or deflate the mold 100. The mold 100 includes a first portion and a second portion that are connected at a seam 120. In some embodiments the seam 120 is a thermoplastically welded seam.

The first portion and the second portion can be formed of a reinforced fabric 140. In some embodiments, the reinforced fabric 140 is a fabric coated with thermoplastic materials.

The reinforced fabric 140 forms the sides of the mold 100. In FIG. 7, a first side 142, a second side 144, and a third side 146 of the mold 100 each have a first thickness. A fourth side 148 of the mold has a second thickness, which is greater than the first thickness. This thicker fourth side 148 has an increased stiffness relative to each of the first side 142, the second side 144, and the third side 146. This results in less surface and shape deflection on the fourth side 148 of the mold 100 during use.

An embodiment of the method of fabricating a tank includes connecting a pressure source to the nozzle 110 on the male mold 100, and inflating the male mold 100 via the nozzle 110. The body of the male mold 100 has an inner surface 150 and an outer surface 152.

The method also includes forming a tank by applying at least one layer over the outer surface of the male mold 100. The tank 105 has a port 106 formed about the nozzle 110. After the tank is formed, the male mold 100 is deflated and withdrawn through the port 106 of the tank 105.

In one embodiment, the male mold is formed by selecting a reinforced thermoplastic fabric, and cutting and welding the fabric into the desired shape of the male mold. The outside dimensions of the flexible male mold are sized to match the inside dimensions of the final tank product. Care must be taken in the selection of the reinforced fabric, such that the desired trade-offs are met between a rigidity of the inflated mold on one hand and a collapsibility of the mold on the other hand. A fabric having a nominal thickness between 4 thousandths of an inch (4 mils) to 200 thousandths of an inch (200 mils) meets most practical application needs for the mold. In an example, welding conditions for a polyvinyl chloride (PVC) reinforced fabric that is 40 thousandths of an inch thick are: 360° F., 6 feet per minute, and 1.5" wedge weld. The flexible mold 100 is sufficiently flexible to be able to be withdrawn from the final part being made. The smaller the port 106 in the final product/tank 105, the more flexible, or rubbery, the fabrication of the mold 100. Seam allowances of the welds should be kept at a minimum, 0.0 to 100 mils wide. Large seam allowances may ultimately telegraph their shape to the final object, which may be an undesirable feature.

Conversely, the male mold 100 is sufficiently rigid so that once the mold is inflated via pneumatic, hydraulic, or other means, the mold 100 will adequately support the subsequent layering process associated with the final tank product. The mold 100 has a durable connection to hydraulic, pneumatic or other pressure sources. The selected materials for the mold 100 also should endure the chemistries that the mold 100 will be in contact with, as well as be sufficiently heat stable to support moderate (150° F. to 300° F.) curing processes. Any chemical incompatibilities between the mold 100 and the product can be mitigated by using release agents that are compatible to both outer surface 152 of the mold 100 and the inside layer of the tank products being built.

In some embodiments, the rigidity of the material of the male mold is measured using a Shore scale. Durometer, using a Shore scale, is an indirect measure of material stiffness, or modulus. Materials with Shore A ratings between 20 to 95 will work for most tank applications. In relation to the previous example of a reinforced PVC coated fabric that is 40 thousandths of an inch thick, a Shore A rating of 80+/−10 is suitable for a smaller mold (for example, a mold that is less than 1 cubic foot in volume) that has a simple geometry.

In some embodiments, large flat areas of the mold 100 include unique materials, or amounts of materials, placed within them for added rigidity. For example, the larger areas may need to use a 100 thousandths of an inch thick material, where the balance uses a 40 thousandths of an inch thick material. Additionally, the stiffness of these larger areas may need to be uniquely higher. Continuing with this example, the material may need to be a Shore A rating of 80 or higher. If too flexible, these larger areas would be prone to billowing when inflated. Using a non-elastic reinforced textile also mitigates the propensity for the mold to billow when inflated.

In relation to FIG. 7, exemplary dimensions for the reinforced fabric include a thickness of 40 thousandths of an inch along the first side 142, the second side 144, and the third side 146, and a thickness of 100 thousandths of an inch along the fourth side 148.

Coating materials can also be selected that have sharp Tg levels, or softening temperatures at or above 100° F. Thermoplastic materials that soften at a temperature that can be safely handled between 100° F. to 160° F., assist in the removal of the mold, after the tank layers have been fabricated. Once the mold has been removed, the mold can be inflated, cooled, and returned to its shape.

Figure 8:
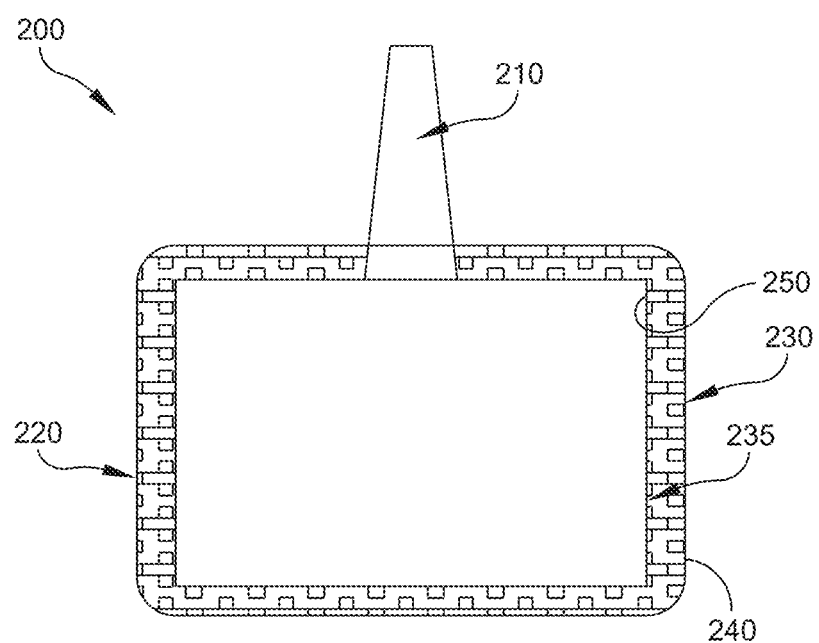
FIG. 8 is a cross-sectional view of another embodiment of a flexible, reusable mold.

Referring now to FIG. 8, a second embodiment of a mold 200 having an inflation nozzle 210 is shown. The inflation nozzle 210 extends from the mold 200 to allow a user to inflate the mold.

The mold 200 is formed by another subtractive method, which includes selecting a base fabric 220, and then sewing, seaming, welding, or otherwise connecting the base fabric 220 into the designed final shape of the mold 200. In some embodiments, the base fabric 220 includes fabric that is nonwoven, woven, knit, and/or fabric-formed by another method. This base fabric 220, or substrate, is subsequently coated with an outer polymeric layer 230 and an inner polymeric layer 235 to impart the desired release, flexibility, stiffness, strength, heat, pneumatic and/or hydraulic barrier properties required of the final flexible male mold. The outer polymeric layer 230 is applied to the outer surface of the fabric 220 to form an outer surface 240 of the mold 200. The inner polymeric layer 235 is applied to the inner surface of the fabric 220 to form an inner surface 250 of the mold 200.

In one example of the mold 200, knitted fabrics are well-suited for the base fabric 220, as the knitted fabrics provide good drapability and multidirectional stretch. In one example, knitted fabric is a 7 gauge knitted jersey, using a 1000 denier HT-PET yarn. In various embodiments, the final weight of the fabric, depending on stitch length, ranges between 2 to 10 ounces per square yard. The final outside dimensions of the coated fabric mold, are sized to match the needs of the inside dimensions of the final part to be molded. For example, if the base fabric 220 is 10 thousandths of an inch thick, and if the outer polymeric coating 230 is required to have a thickness of 50 thousandths of an inch to meet the physical properties of the mold 200, then the cutting and sewing process must account for this build-up.

Figure 9:
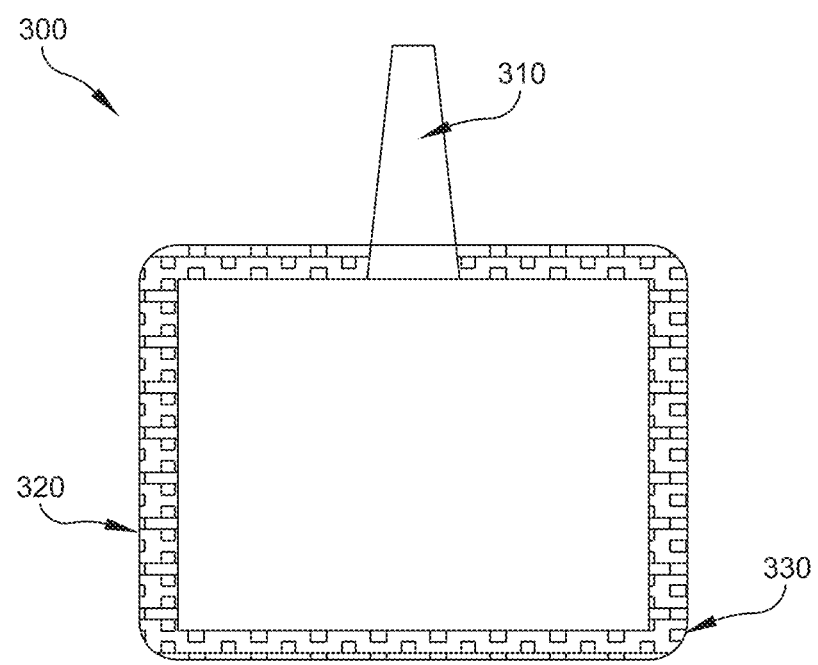
FIG. 9 is a cross-sectional view of another embodiment of a flexible, reusable mold.

FIG. 9 shows a third embodiment 300 of a mold formed by a third subtractive method. The mold 300 includes an inflation nozzle 310, through which a user can inflate and deflate the mold 300.

In one embodiment, the mold 300 of FIG. 9 is formed by the subtractive method that includes selecting a non-reinforced film or films 320, and welding, bonding, or adhering the non-reinforced film(s) at a seam 330 into the final shape of the male mold 300. In some embodiments, the seam 330 is a thermoplastic welded seam.

This method is best suited for smaller molds, where lower internal pressure levels, of less than 2.0 Bar are needed in the mold 300 to maintain the inflated dimensions of the final mold 300.

Materials such as polytetrafluoroethylene (PTFE) and polyvinylidene fluoride (PVDF) work well for the film(s) 320 in this application owing to the inherent release characteristics of PTFE and PVDF when removing the mold from the molded tank or object being built. In various embodiments, the thickness of the film(s) 320 is in the range of 2 thousandths of an inch to 20 thousandths of an inch.

Figure 10:
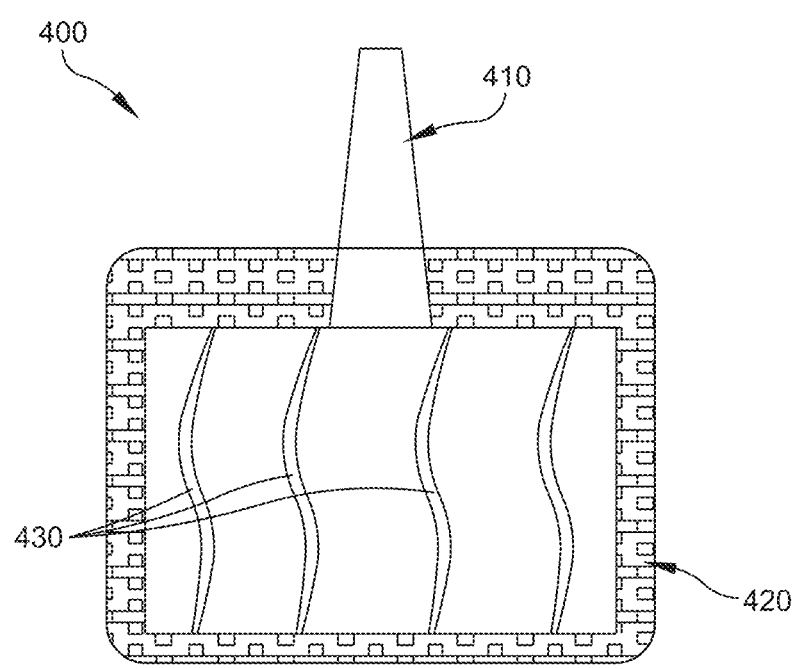
FIG. 10 is a cross-sectional view of another embodiment of a flexible, reusable mold.

FIG. 10 shows an embodiment of an inflatable male mold 400 that is formed by additive manufacturing. The mold 400 can be inflated via pneumatic, hydraulic, or other means via a nozzle 410. The mold 400 is a non-reinforced male mold that can be direct printed with a 3D printer using 3D printed polymeric material 420. During the 3D printing, temporary struts 430 are used to support the polymeric material 420 in the desired shape to form the mold 400.

The mold 400 has a suitable wall thickness to give it durability for multiple uses and flexibility. Depending on the size of the mold 400, the wall thickness may range between 4 thousandths of an inch to 200 thousandths of an inch. In some embodiments, the material 420, or feedstock selection, has rubbery and/or elastomeric properties. At the same time, the mold material 420 is sufficiently stiff to hold the various shapes and dimensions of the male mold. These criteria are the same as in the subtractive methods described above in relation to FIGS. 7-9.

In some embodiments, the material 420 is an elastomer. In one embodiment, the material 420 includes one or more thermoplastic elastomers (TPEs) that have hardness, or stiffness levels in the range of 30 to 95 Shore A durometer, which is sufficient for most applications. The softer the material 420, the more struts 430 that will need to be incorporated into the 3D print build, and therefore subsequently removed before use as a mold 400. Like the subtractive methods described in relation to FIGS. 7-9, the material selection accounts for the chemistries, stresses, and curing environments that the mold 400 will endure in the subsequent product build-up.

Rather than a rubbery feedstock, the material 420 in some embodiments is an elastomeric material with a sharp glass transition temperature, or softening point, at a temperature range between 120° F. to 160° F. Upon heating, the stiff 3D printed mold 400, the material 420 of the mold 400 softens to a more flexible state. Once cooled, the material 420 of the mold 400 is hard, rendering further hydraulic or pneumatic pressure unnecessary. Heating the mold 400 prior to removal from the tank that is formed on the mold 400 also facilitates removal of the tank from the mold 400. As with the subtractive manufacturing methods, larger areas of the mold 400 can be reinforced with thicker layers, for added support and stiffness. These larger areas can also be supplemented with unique feedstock materials.

In some embodiments, the same 3D printer could be used to build a complementary female mold (having two or more parts), if casting resins are to be used in the tank build-up process. In some embodiments, the female molds include more conventional, and harder materials, such as acrylonitrile butadiene styrene (ABS), nylon, polyethylene terephthalate (PET), other materials, and/or combinations thereof. The build sizes and speeds of 3D printers enables an ever-wider range of fuel tank size molds to made with this technology.

Figure 11:
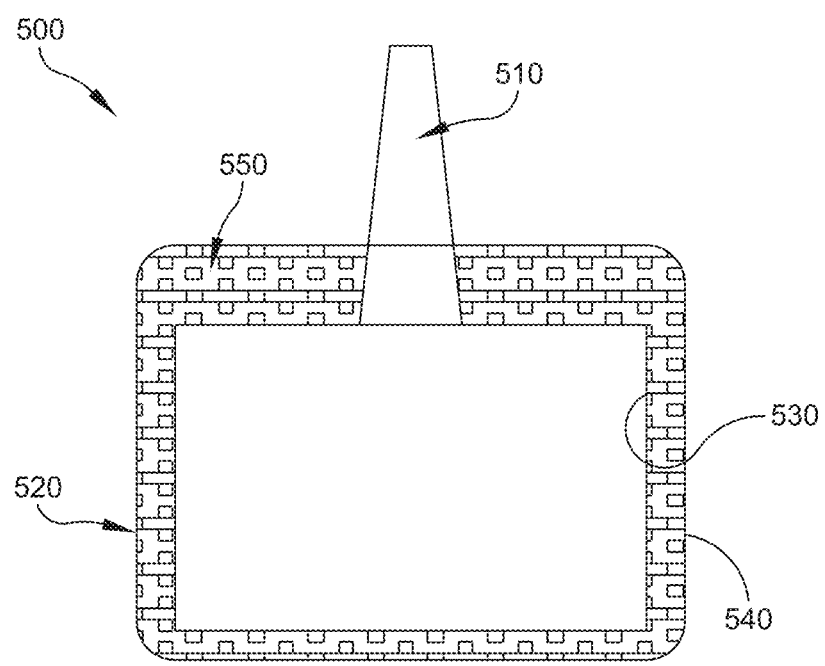
FIG. 11 is a cross-sectional view of another embodiment of a flexible, reusable mold.

FIG. 11 shows another embodiment of a mold 500 that is formed using additive manufacturing techniques. The mold 500 is a male mold that includes a nozzle 510 and a 3D printed textile substrate 520. The textile substrate 520 is coated with an internal polymeric coating 530 and external polymeric coating 540.

In some embodiments, the internal coating 530 is the same as the external coating 540. In some embodiments, the internal coating 530 is a different coating material than the external coating 540. Internal coatings may be of lower cost materials, such as high filled PVCs, thermoplastic olefins (TPOs), and TPUs. A consideration for the polymeric type, other than cost, is the melt flow characteristics of the feedstock through the extruder/printer. The external layer is ideally produced with materials with high release properties such as PVDF or PTFE. The mold includes a thickened region 550 adjacent the nozzle 510. The thickened region 550 is located where deflection or deformation of the surface of the mold 500 needs to be minimized or eliminated.

A method for assembling a reusable reinforced male mold 500 of FIG. 11 includes first 3D printing a textile structure to the size and shape of the male mold. Once knitted or woven, the textile substrate is coated with the internal coating 530 and the external coating 540, each including an elastomeric, rubber, or rubber-like material, so that the mold 500 can retain pneumatic or hydraulic pressure, to hold the final shape of the mold 500. A reinforced flexible male bladder is needed for larger molds where higher inflation pressures are needed to fill-out the mold. In some embodiments of the mold 500, longer flat surfaces are uniquely reinforced with stiffer or heavier materials, so that they do not billow during inflation of the mold 500. The coating requirements, considerations, and precautions are essentially the same as in the subtractive manufacturing methods discussed above in relation to FIGS. 7-10.

Figure 12:
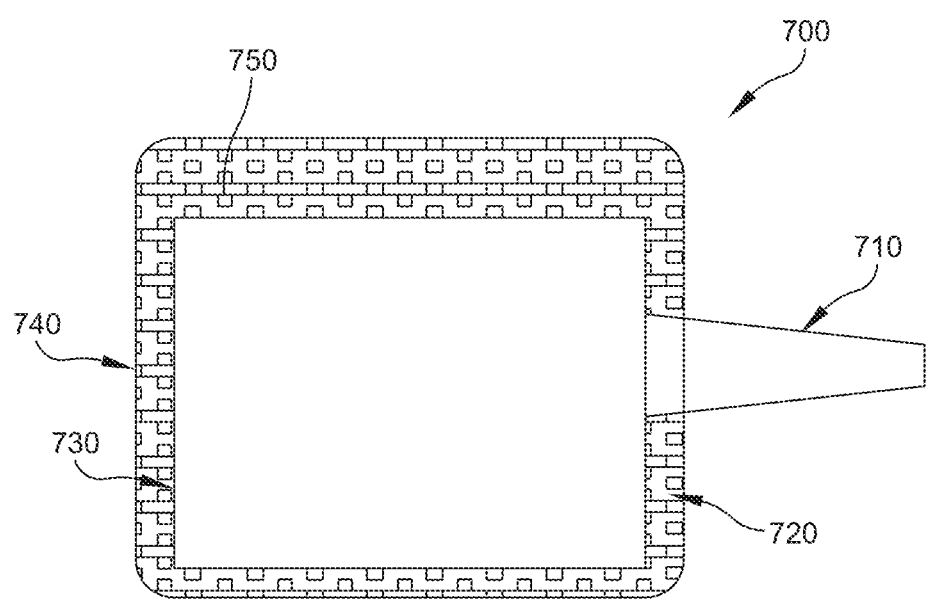
FIG. 12 is a cross-sectional view of another embodiment of a flexible, reusable mold.

FIG. 12 shows an embodiment of a male mold 700 having an inflation nozzle 710 and a 3D printed textile substrate 720. A first 3D printed coating 730 is applied to an inner surface of the printed substrate 720. A second 3D printed coating 740 is applied to an outer surface of the printed substrate 720. A side 750 portion of the mold 700 has a relatively thicker cross-section for reduced surface deflection. This embodiment of a male mold 700 is formed by an additive manufacturing approach that integrates 3D printing with 3D textile printing. In some embodiments of this approach, the 3D textile printing of the textile substrate 720 is in parallel with the 3D printing of the first and second coatings 730, 740 directly into the final male mold form. In some embodiments of this approach, the 3D textile printing of the textile structure is in series with the 3D printing of the rubber/elastomeric coating directly into the final male mold form.

In some embodiments, the first 3D printed coating 730 is a rubber or elastomeric coating. In some embodiments, the second 3D printed coating 740 is a rubber or elastomeric coating, having high release characteristics.

In some embodiments, material selection criteria are the same as covered in earlier examples.

Figure 13:
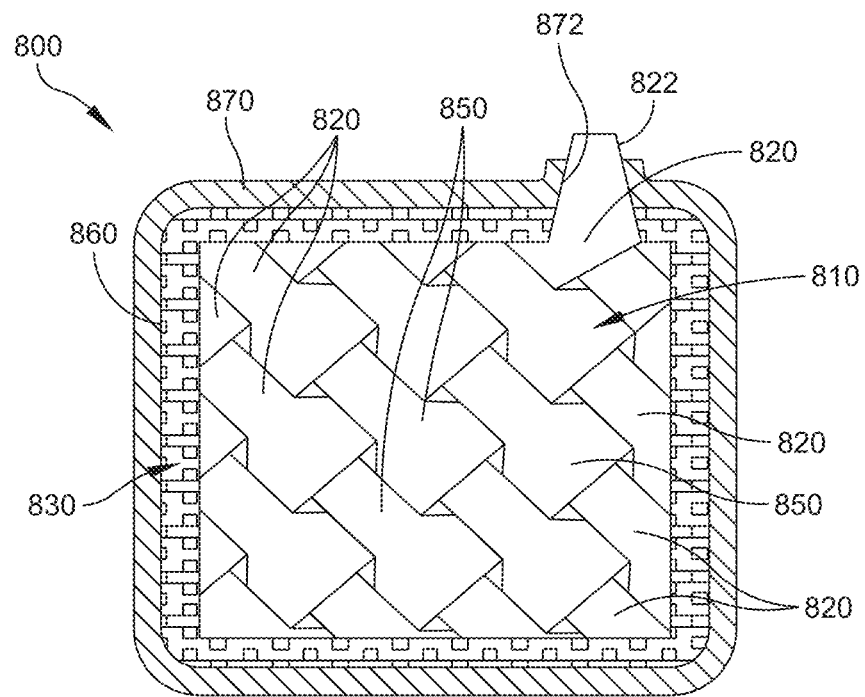
FIG. 13 is a cross-sectional view of another embodiment of a mold.

According to an aspect of the present disclosure, a method of fabricating a tank includes assembling a plurality of foam blocks within a 3D textile printed scaffold to form a male mold having an outer surface. FIG. 13 shows an embodiment of a male mold 800 having an internal support structure 810 that is constructed with foam blocks (foam puzzle pieces). The foam blocks include a plurality of foam blocks including a first set of foam blocks, each indicated at 820, and a second set of foam blocks, each indicated at 850. Each foam block 820 of the first set of foam blocks has a first density (or IFD). The first set of foam blocks 820 are arranged near a periphery of the male mold 800 and contained within a 3D textile scaffold 830. Each foam block of the second set of foam blocks 850 has a second density (or IFD) that is lower than the first density of the first set of foam blocks 820. The second set of foam blocks 850 is arranged in a core of the male mold 800.

The foam blocks 820, 850 are assembled to form the internal support structure within the 3D textile scaffold 830. On an outer surface of the 3D textile 830 is a release film 860, which becomes an external or internal layer of the final product. The method includes forming a tank 870 on the outer surface of the male mold 800, and withdrawing the male mold 800 through a port defined in the tank.

In some embodiments, at least one foam block of the first set of foam blocks 820 includes at least one locator pin 822 for forming a port 872 on the tank 870.

The mold 800 is particularly well suited for larger tanks, and when the port sizes allow for the insertion (and eventual removal) of the foam blocks 820, 850.

In some embodiments, the first set of foam blocks 820 includes higher density (or IFD) or less compressible foams, such as expanded polypropylene foam (EPP foam) and expanded polyethylene foam (EPE foam), cross-linked olefins, other high density foams, and/or combinations of these. These less compressible, or more rigid, foam blocks 820 are treated with the appropriate type of release agents or durable coatings, as they are located closest to the 3D printed textile scaffold. Foam densities between 1.0 to 6.0 pounds per cubic foot work well for this application technique.

The second set of foam blocks 850 include more compressible, and lower density (or lower IFD) foam types, and form the inner core of the mold 800. For example, the second set of foam blocks 850 can be made of foams with greater rebound properties, such as urethane and reticulated foams. These inner blocks would not need to be coated or treated with a release agent.

The second set of foam blocks 850 help keep the targeted dimensions of the male mold 800, while also facilitating their placement and positioning within the 3D textile 830. Once the mold 800 has been fully assembled, and is within the 3D textile scaffold 830, a tank can be coated in some embodiments with any desired elastomeric, rubber, or other coatings and materials. Once the final tank 870 has been assembled, cured, etc., the foam blocks 820, 850 are then removed from the port 872. When using the proper release agents, these foam blocks 820, 850 can be reused multiple times. The foam block method is also well-suited for tanks for which the manufacturer prefers to use a layer-up or layering method for constructing the walls of the tank.

Figure 14:
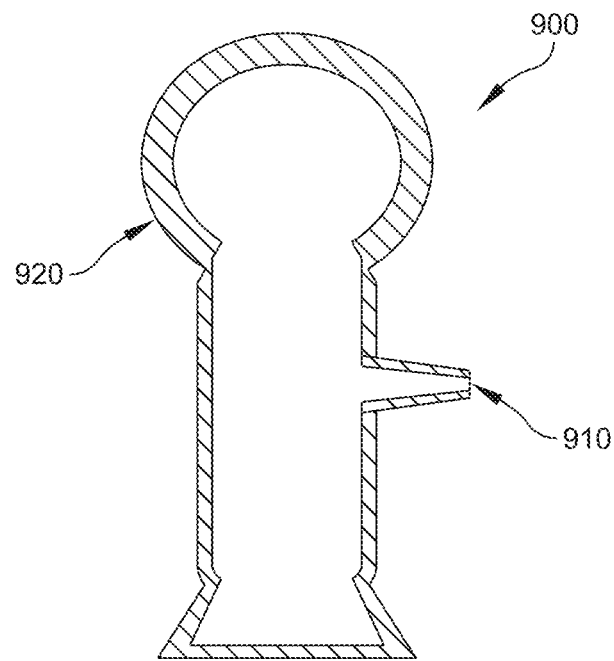
FIG. 14 is a cross-sectional view of another embodiment of a flexible, reusable mold.

FIG. 14 depicts the versatility of the methods and molds of the present disclosure. Disposable molds of the prior art, such as plaster molds, are labor intensive and material intensive without adding value. Such disposable molds are destroyed once the final product has been built. The cost of manufacturing a product is ultimately passed on to the customer, and may be absorbed by the manufacturer on higher cost objects and greater size objects. As the shape of the mold becomes more complex, and when the mold includes smaller access ports, the destructive plaster approach becomes more technically restrictive and more commercially cost prohibitive. Destruction of the mold and clean removal of the mold is difficult through smaller ports, and around or out of more complex surfaces. As a molded product gets smaller, generally speaking, its cost becomes disproportionately greater. Therefore, increasing the labor component and complexity of fabricating smaller parts can result in some objects not being able to be economically made. FIG. 14 shows a mold 900 that was produced via the same 3D printing method as the mold 400 of FIG. 10. The mold 900 includes a connection nozzle 910. The mold 900 includes a polymeric coated wall 920.

Figure 15:
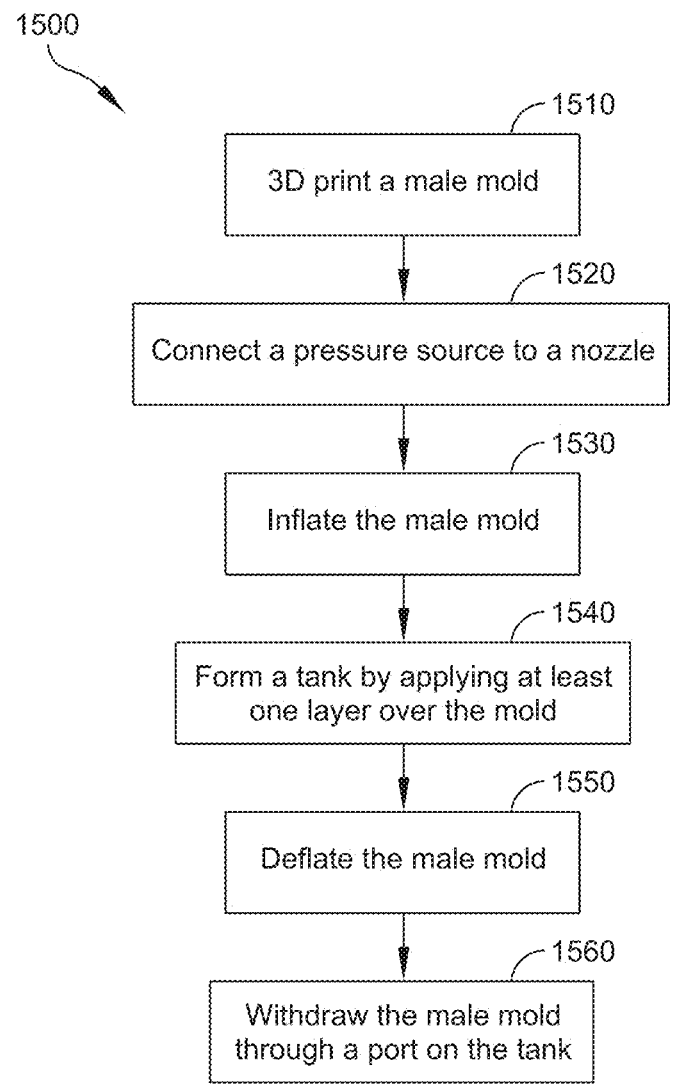
FIG. 15 is a schematic diagram of an exemplary method of using a mold to form a tank.

According to one aspect of the present disclosure, a method of fabricating a tank is provided. In the method 1500 of FIG. 15, a male mold is 3D printed at 1510. The male mold has a body, an inner surface and an outer surface.

At 1520, a pressure source is connected to a nozzle on the male mold. At 1530, the male mold is inflated via the nozzle. At 1540, a tank is formed by applying at least its initial layer over the outer surface of the male mold. Alternatively, the tank can be assembled, by layering-up all of its ultimate functional layers. The tank has a port formed about the nozzle. At 1550, the male mold is deflated. At 1560, the male mold is withdrawn through the port, cleaned, and stored for future reuse.

In some embodiments, the male mold has a wall thickness between 4 thousandths of an inch and 200 thousandths of an inch. In some embodiments, the male mold includes one of a rubber and an elastomeric material. In some embodiments, the male mold includes an elastomeric material with a sharp glass transition temperature between 120° F. and 160° F.

In some embodiments, the method at 1510 also includes 3D-printing a complementary female mold, and 1540 includes forming the tank between the male mold and the female mold. In some embodiments, the female mold includes a material selected from: ABS, nylon, and PET. Embodiments requiring more highly refined final dimensions, may require the use of a complementary female mold. Flexible fuel tanks, vessels, pontoons, and the like, by their very definition will often not require the assist of a female mold in these processes.

In some embodiments, the method 1500 includes positioning a plurality of support struts within the male mold before 3D printing at 1510 and removing the plurality of support struts before forming the tank at 1540.

In some embodiments, 3D-printing the male mold at 1510 includes 3D-printing a textile structure and coating the textile structure with a coating having rubber and/or an elastomeric material.

In some embodiments, the coating includes a first coating applied to the inner surface of the male mold and a second coating applied to the outer surface of the male mold.

In some embodiments, 3D-printing the male mold at 1510 includes 3D-printing a textile structure and 3D-printing a coating comprising rubber and/or an elastomeric material.

In some embodiments 3D-printing the textile structure and 3D-printing the coating are performed in parallel. In some embodiments 3D-printing the textile structure and 3D-printing the coating are performed in series.

Figure 16:
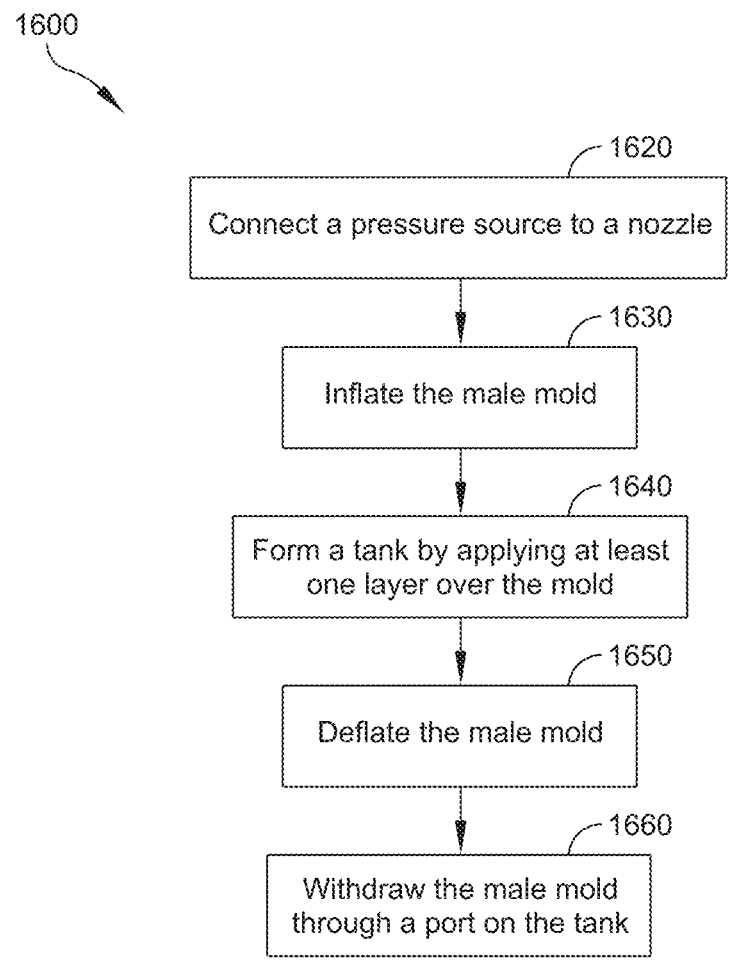
FIG. 16 is another schematic diagram of an exemplary method of using a mold to form a tank.

Referring to FIG. 16, another method 1600 of fabricating a tank is provided.

At 1620, a pressure source is connected to a nozzle on a previously formed male mold. In some embodiments, the male mold has a first portion and a second portion connected at a seam. The male mold has an inner surface and an outer surface.

At 1630, the male mold is inflated via the nozzle. At 1640, a tank is formed by applying at least one layer over the outer surface of the male mold. The tank has a port formed about the nozzle. At 1650, the male mold is deflated. At 1660, the male mold is withdrawn through the port.

In some embodiments, the male mold includes a PVC coated reinforced fabric having a thickness between 5 and 125 thousandths of an inch.

In some embodiments, the male mold includes a material that has a Shore A hardness between 20 and 95.

In some embodiments, forming the tank at 1640 further includes curing the tank at a temperature between 150° F. and 300° F.

In some embodiments, the method includes coating the outer surface of the male mold with a release agent prior to inflating the mold with the nozzle at 1640.

In some embodiments, a reinforced portion of the male mold has a first thickness of at least 100 thousandths of an inch and an adjacent portion has a second thickness of 40 thousandths of an inch.

In some embodiments, the male mold includes a reinforced thermoplastic or thermoset fabric. In some embodiments, the male mold includes a knitted jersey fabric having at least one first polymeric layer on an inner surface of the knitted jersey fabric and at least one second polymeric layer on an outer surface of the knitted jersey fabric. In some embodiments, the male mold includes a non-reinforced film.

Figure 17:
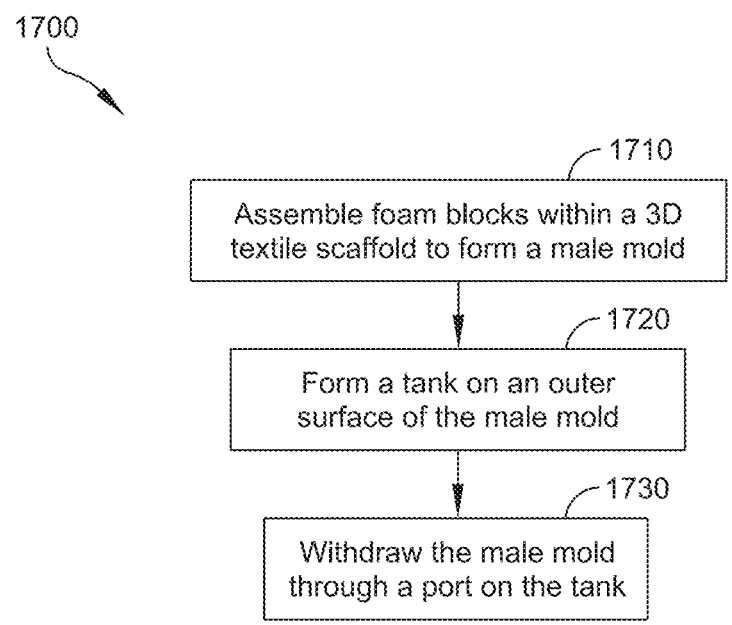
FIG. 17 is another schematic diagram of an exemplary method of using a mold to form a tank.

In relation to FIG. 17, a method 1700 of fabricating a tank includes assembling a plurality of foam blocks within a 3D textile scaffold to form a male mold having an outer surface at 1710. The plurality of foam blocks includes a first set of foam blocks and a second set of foam blocks. Each foam block of the first set of foam blocks has a first density, and the first set of foam blocks is arranged near a periphery of the male mold. Each foam block of the second set of foam blocks has a second density that is lower than the first density. The second set of foam blocks is arranged in a core of the male mold.

At 1720, a tank is formed on the outer surface of the male mold. At 1730, the male mold, or foam pieces, is(are) withdrawn through a port defined in the tank.

In some embodiments, at least one of the foam blocks of the first set of foam blocks includes at least one locator pin for assisting the subsequent forming of the final port on the tank.

It should be understood, of course, that the foregoing relates to exemplary embodiments of the disclosure and that modifications may be made without departing from the spirit and scope of the present disclosure. Those skilled in the art should appreciate that the parameters and configurations described herein are exemplary and that actual parameters and/or configurations will depend on the specific application in which the disclosed systems and techniques are used. Those skilled in the art should also recognize or be able to ascertain, using no more than routine experimentation, equivalents to the specific embodiments disclosed. For example, those skilled in the art may recognize that the system, and components thereof, according to the present disclosure may further comprise a network or systems or be a component of containment bladder manufacturing system. It is therefore to be understood that the embodiments described herein are presented by way of example only and that, within the scope of the appended claims and equivalents thereto; the disclosed embodiments may be practiced otherwise than as specifically described. The present systems and methods are directed to each individual feature, system, or method described herein. In addition, any combination of two or more such features, systems, or methods, if such features, systems, or methods are not mutually inconsistent, is included within the scope of the present disclosure. The steps of the methods disclosed herein may be performed in the order illustrated or in alternate orders and the methods may include additional or alternative acts or may be performed with one or more of the illustrated acts omitted.

Further, it is to be appreciated that various alterations, modifications, and improvements will readily occur to those skilled in the art. Such alterations, modifications, and improvements are intended to be part of this disclosure, and are intended to be within the spirit and scope of the disclosure. In other instances, an existing facility may be modified to utilize or incorporate any one or more aspects of the methods and systems described herein. Thus, in some instances, the systems may involve connecting or configuring an existing facility to comprise a containment bladder manufacturing system or components of a containment bladder manufacturing system. Accordingly the foregoing description and figures are by way of example only. Further the depictions in the figures do not limit the disclosures to the particularly illustrated representations.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While exemplary embodiments of the disclosure have been disclosed, many modifications, additions, and deletions may be made therein without departing from the spirit and scope of the disclosure and its equivalents, as set forth in the following claims.

What is claimed is:

1. A method of fabricating a seamless fuel tank, the method comprising:
    3D-printing a mold, the mold including a body having a first side wall, a second side wall opposite the first side wall, an inner surface, an outer surface and a nozzle extending outwardly from and supported by the second side wall, the first side wall having a first wall thickness and the second side wall having a second wall thickness that is greater than the first thickness, the outer surface having a concave portion and a convex portion;
    connecting a pressure source to the nozzle on the mold;
    inflating the mold via the nozzle;
    forming a seamless, flexible fuel tank by layering-up a plurality of layers over the outer surface of the inflated mold via additive manufacturing, the flexible fuel tank having a port formed about the nozzle, and the tank surrounding the mold;
    deflating the mold; and
    withdrawing the mold through the port of the fully formed, flexible fuel tank,
    wherein the mold is a male mold, and
    wherein the mold is fabricated from a durable and rigid material having a Shore A rating between 20 and 95.

2. The method of claim 1, wherein the first wall thickness and the second wall thickness are between 4 thousandths of an inch and 200 thousandths of an inch.

3. The method of claim 1, wherein the mold includes one of a rubber and an elastomeric material.

4. The method of claim 1, wherein the mold includes an elastomeric material with a glass transition temperature between 120° F. and 160° F.

5. The method of claim 1, further comprising positioning a plurality of support struts within the mold and removing the plurality of support struts before forming the flexible fuel tank.

6. The method of claim 1, wherein 3D-printing the mold includes 3D-printing a textile structure and coating the textile structure with a coating having one of: rubber and an elastomeric material.

7. The method of claim 1, wherein the coating includes a first coating applied to the inner surface of the mold and a second coating applied to the outer surface of the mold.

8. The method of claim 1, wherein 3D-printing the mold includes 3D-printing a textile structure and 3D-printing a coating comprising one of rubber and an elastomeric material.

9. The method of claim 8, wherein 3D-printing the textile structure and 3D-printing the coating are performed in one of parallel and series.

10. The method of claim 1, wherein forming the seamless tank by layering-up the plurality of layers over the outer surface of the inflated mold comprises one of CAD-knitting and CAD-weaving.

11. The method of claim 1, wherein forming the seamless tank by layering-up the plurality of layers over the outer surface of the inflated mold comprises 3D knitting.

12. The method of claim 1, wherein the mold is one of knitted and woven.

* * * * *